(12) United States Patent
Myhre et al.

(10) Patent No.: US 9,337,740 B2
(45) Date of Patent: May 10, 2016

(54) DC-DC CONVERTER DEVICE

(71) Applicant: Eltek AS, Drammen (NO)

(72) Inventors: Erik Myhre, Asker (NO); Thomas Olsen, Asker (NO); Jan Tore Brastad, Drammen (NO)

(73) Assignee: Eltek AS, Drammen (NO)

( * ) Notice: Subject to any disclaimer, the term of this patent is extended or adjusted under 35 U.S.C. 154(b) by 38 days.

(21) Appl. No.: 14/391,755

(22) PCT Filed: Apr. 4, 2013

(86) PCT No.: PCT/EP2013/057097
§ 371 (c)(1),
(2) Date: Oct. 10, 2014

(87) PCT Pub. No.: WO2013/152985
PCT Pub. Date: Oct. 17, 2013

(65) Prior Publication Data
US 2015/0062973 A1    Mar. 5, 2015

Related U.S. Application Data

(60) Provisional application No. 61/623,289, filed on Apr. 12, 2012.

(30) Foreign Application Priority Data

Apr. 12, 2012   (GB) ................................. 1206478.8

(51) Int. Cl.
*H02M 1/32*       (2007.01)
*H02M 1/36*       (2007.01)
(Continued)

(52) U.S. Cl.
CPC ........ *H02M 3/33507* (2013.01); *H02H 7/1255* (2013.01); *H02M 1/32* (2013.01);
(Continued)

(58) Field of Classification Search
CPC .......... H02M 2001/0032; H02M 1/36; H02M 2001/0038; H02M 2001/0041; H02M 1/32; H02M 3/33592; H02M 3/33569
See application file for complete search history.

(56) References Cited

U.S. PATENT DOCUMENTS

| 6,677,738 B1 | 1/2004 | Hesse | |
| 2005/0007082 A1* | 1/2005 | Bretz | H02M 1/32 323/274 |

(Continued)

FOREIGN PATENT DOCUMENTS

| GB | 2455568 A | 6/2009 |
| WO | 2009/028954 A1 | 3/2009 |

(Continued)

OTHER PUBLICATIONS

International Search Report issued in PCT/EP2013/057097 mailed on Aug. 19, 2013 (2 pages).

(Continued)

*Primary Examiner* — Timothy J Dole
*Assistant Examiner* — Ishrat Jamali
(74) *Attorney, Agent, or Firm* — Osha Liang LLP

(57) ABSTRACT

A DC-DC converter device and method for controlling the DC-DC converter device includes controlling gate drivers connected to the respective gate of first and second resonant circuit switches of a resonant circuit, controlling gate drivers connected to the respective gate of first and second rectifier switches of a synchronous rectifier, and detecting whether a shutdown criteria is fulfilled or not. If the shutdown criteria is fulfilled, the method is further includes the step of sending a shutdown signal to a shutdown device.

4 Claims, 6 Drawing Sheets

(51) Int. Cl.
*H02M 3/335* (2006.01)
*H02H 7/125* (2006.01)
*H02M 1/00* (2006.01)

(52) U.S. Cl.
CPC .......... *H02M 1/36* (2013.01); *H02M 3/33515* (2013.01); *H02M 3/33569* (2013.01); *H02M 3/33592* (2013.01); *H02M 2001/0032* (2013.01); *H02M 2001/0038* (2013.01); *H02M 2001/0041* (2013.01); *Y02B 70/1433* (2013.01); *Y02B 70/1475* (2013.01)

(56) References Cited

U.S. PATENT DOCUMENTS

2008/0101102 A1* 5/2008 Lipcsei ............... H02M 3/1582
363/74
2008/0174292 A1* 7/2008 Nishida ................. H02M 3/156
323/284
2010/0182806 A1* 7/2010 Garrity ............ H02M 3/33569
363/21.14

FOREIGN PATENT DOCUMENTS

WO 2009/058024 A1 5/2009
WO 2009-078728 A1 6/2009

OTHER PUBLICATIONS

Written Opinion of the International Searching Authority issued in PCT/EP2013/057097 mailed on Aug. 19, 2013 (6 pages).
International Preliminary Report on Patentability from PCT/EP2013/057097 issued on Jul. 31, 2014 (13 pages).
Great Britain Search Report issued in GB1206478.8 mailed on Jul. 26, 2012 (4 pages).

* cited by examiner

Fig. 1: Prior art

DC-DC CONVERTER DEVICE

CROSS-REFERENCE TO RELATED APPLICATIONS

This application is a National Stage Application of International Patent Application No. PCT/EP2013/057097, filed on Apr. 4, 2013, which claims priority pursuant to Article 8 of the Patent Cooperation Treaty, 35 U.S.C. §119(a), and 119(e) to United Kingdom Patent Application No. 1206478.8 and U.S. Provisional Patent Application No. 61/623,289, respectively, both filed on Apr. 12, 2012. Each of the above-cited priority applications are hereby incorporated by reference in their entireties.

BACKGROUND

Several types of converters are known for use in power supply systems, where there is a need to convert an AC power to a controlled DC power. The AC power will usually be supplied from an AC power source, such as the mains. The DC power is supplied to equipment such as telecommunication equipment, broad band data communication equipment (GSM/UMTS base stations etc), military equipment, medical equipment etc.

There are several requirements for such power supply systems. First of all, the efficiency should be high, i.e. the losses should be low. The power supply system described in WO 2009/028954 and WO 2009/058024 has an efficiency of ca 96% and is marketed and sold by Eltek Valere under the name FlatPack 2 HE. The power supply system provided as a unit for insertion into a rack. The unit has an height of 1 U (the standard height of one shelf in a rack, corresponding to 44.5 mm), a length of 328 mm and a width of 109 mm so that four such units may be provided next to each other in a 19" rack. The unit may deliver a power of 2 kW or 3 kW at −48V DC.

One object of the next generation power supply is to provide a smaller unit having substantially the same power as the above power supply system and with a relatively high efficiency. More specifically, the new unit should be 1 U high. The length should be 220 mm so that the unit and the rack may be provided in a 30 cm power cabinet. In addition, the width should 72 mm in order to provide that six such units may be provided next to each other in a 19" rack. The unit should be able to supply a power of 2-3000 W at −48V DC. Hence, the available volume for the components is reduced by approximately 55%.

Another object of the next generation power supply system is to reduce costs. One contribution to cost reduction is the reduced size. Another contribution to cost reduction is to use cheaper electronic components such as processor units etc.

However, such electronic components are simpler, and consequently, effort must be put into using the electronic components smarter. One way of achieving this is to reduce the number of calculations needed for controlling the power supply system.

The power supply system comprises a fan for blowing air through the unit. The fan is normally located high the front side of the unit and blows air out through the rear side of the unit. The increased power density (power per volume unit) of the unit makes it difficult to achieve a satisfying air flow through the unit.

In order to be able to achieve the objects above, a redesign of the printed circuit card and the organization of the electronic components were necessary. In FIG. 1, the prior art DC-DC converter 1 shown in WO 2009/028954 is disclosed, with a LLC resonant circuit indicated by a dashed box 2 and a synchronous rectifier indicated by dashed box 3. The LLC resonant circuit 2 comprises two switches Sdc1, Sdc2 having respective gates Gsdc1, Gsdc2, and the synchronous rectifier 3 comprises two switches Sr1, Sr2 having respective gates Gsr1, Gsr2. These switches are controlled by a digital signal processor or DSP connected via a gate driver. Hence, gate control terminals GCsr1, GCsr2, GCdc1, GCdc2 of the DSP controls the state of respective switches.

To keep the costs low, it is desired to use low end digital signal processors to control the switches. One example of such a low end DSP is the Texas Instruments TMS320F28032PAGT, having a cost of less than $5 per unit. However, in order to be able to use such DSPs, they must be programmed smarter. Still, it has turned out that such DSPs is not capable of handing failure situations in a satisfying way, due to a relatively low number of instructions per second in the DSP.

During normal operation, the output current Iout is positive. However, if a failure situation occurs, for example due to a short circuit of the load, this current will be negative. In such situations, the switches Sr1 and Sr2 of the LLC resonant circuit must be turned low quickly in order to protect the components of the converter. However, forcing the switches Sr1 and Sr2 low may result in bad field performance.

One or more embodiments of the invention provide a DC-DC converter which solves the above problems and which makes it possible to provide a reliable power supply unit with the specifications mentioned above.

SUMMARY

One or more embodiments of the present invention relate to a DC-DC converter device. The converter device includes: a resonant circuit including DC input terminals and first and second resonant circuit switches each having a gate. The converter device further includes a synchronous rectifier connected to the resonant circuit, where the synchronous rectifier comprises DC output terminals and first and second rectifier switches, each having a gate. The converter device further includes a digital signal processor comprising rectifier switch gate control terminals for controlling the first and second rectifier switches respectively, and resonant circuit switch gate control terminals for controlling the first and second resonant circuit switches respectively. The converter device further includes a gate driver connected between each rectifier switch gate control terminal and the respective gate of the first and second rectifier switches; where the DC-DC converter device further comprises. The converter device further includes a shutdown device connected between each rectifier switch gate control terminal and either an enable terminal of the corresponding gate driver or the gate of the corresponding rectifier switch. The converter device further includes a shutdown signal conductor connected between the digital signal processor and the shutdown device for transferring a shutdown signal from the digital signal processor to the shutdown device. The shutdown device is configured to control the gates of the first and second rectifier switches to stay low if the corresponding rectifier switch gate control terminal was turned low when receiving the shutdown signal, and to control the gates of the first and second rectifier switches to stay high if the corresponding rectifier switch gate control terminal was turned high when receiving the shutdown signal. The shutdown device is further configured to control, when the first and/or second rectifier switch gate control terminal is turned low by the digital signal processor, the gate of the corresponding rectifier switch to stay low.

In one aspect, the shutdown device comprises a state storing device for each rectifier switch.

In one aspect, each state storing device is a flip-flop device.

One or more embodiments of the present invention also relates to a method for controlling a DC-DC converter device including the following steps performed by a digital signal processor: controlling gate drivers connected to the respective gate of first and second resonant circuit switches of a resonant circuit; controlling gate drivers connected to the respective gate of first and second rectifier switches of a synchronous rectifier; detecting whether a shutdown criteria is fulfilled or not. If the shutdown criteria is fulfilled, the method is further includes the steps of: sending a shutdown signal to a shutdown device. The shutdown device performs the steps of: controlling the gates of the first and second rectifier switches to stay low if they were already turned low by way of the digital signal processor; controlling the gates of the first and second rectifier switches to stay high if they already was turned high by the digital signal processor, and, controlling the gates of the corresponding rectifier switch to stay low when they are turned low by the digital signal processor.

BRIEF DESCRIPTION OF THE DRAWINGS

Embodiments of the invention will now be described in detail with reference to the enclosed drawings, where.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

It is now referred to FIG. 1 again, illustrating a DC-DC converter device 1 comprising a resonant circuit 2 and a synchronous rectifier 3 connected to the resonant circuit 2.

The resonant circuit 2 is comprising DC input terminals Tin1, Tin2 and first and second resonant circuit switches Sdc1, Sdc2. The first resonant circuit switch Sdc1 is connected between the first or positive input terminal Tin1 and a third node N3. The second resonant circuit switch Sdc2 is connected between the second or negative input terminal Tin2 and the third node N3.

A resonant circuit inductor Ldc is connected between the third node N3 and a first input terminal of the transformer device Tdc. A resonant circuit capacitor Cdc is connected between the negative input terminal Tin2 and a second input terminal of the transformer device Tdc.

The synchronous rectifier 3 comprises DC output terminals Tout1, Tout2 and first and second rectifier switches Sr1, Sr2. The first rectifier switch Sr1 is connected between a first output terminal of the transformer device Tdc and the negative output terminal Tout2. The second rectifier switch Sr2 is connected between a second output terminal of the transformer device Tdc and the negative output terminal Tout2.

A rectifier capacitor Cr is connected between a third output terminal of the transformer device Tdc and the negative output terminal Tout2.

The third output terminal of the transformer device Tdc is also connected to the positive output terminal Tout1. In this embodiment, the third output terminal of the transformer device Tdc is connected between the first and second output terminals of the transformer device Tdc.

Hence, the input terminals of the transformer device Tdc and the transformer device Tdc itself is defined to be a part of the resonant circuit 2, while the output terminals of the transformer device Tdc is defined to be a part of the synchronous rectifier 3.

The abovementioned switches are switches with anti-parallel diodes such as MOSFET switches. Alternatively, they may be other types of switches connected in parallel with anti-parallel diodes.

It should be noted that the resonant circuit 2 and the synchronous rectifier 3 will not be described in detail herein, since they are described in detail in the abovementioned WO 2009/028954. Moreover, the control algorithm of the switches during normal operation is also considered to be known for a skilled person.

Figure 1:
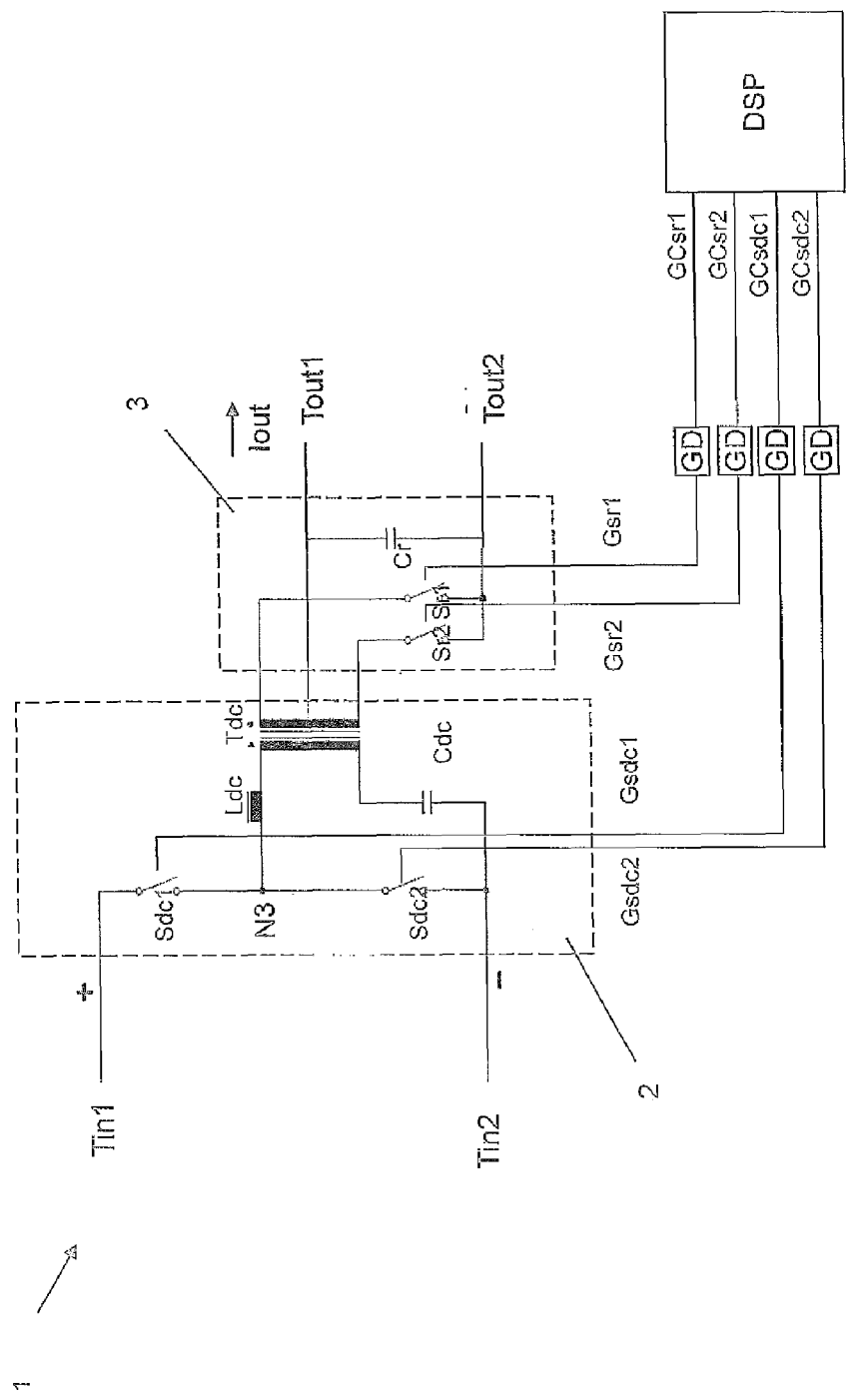
FIG. 1 illustrates a prior art DC-DC converter.
Figure 2:
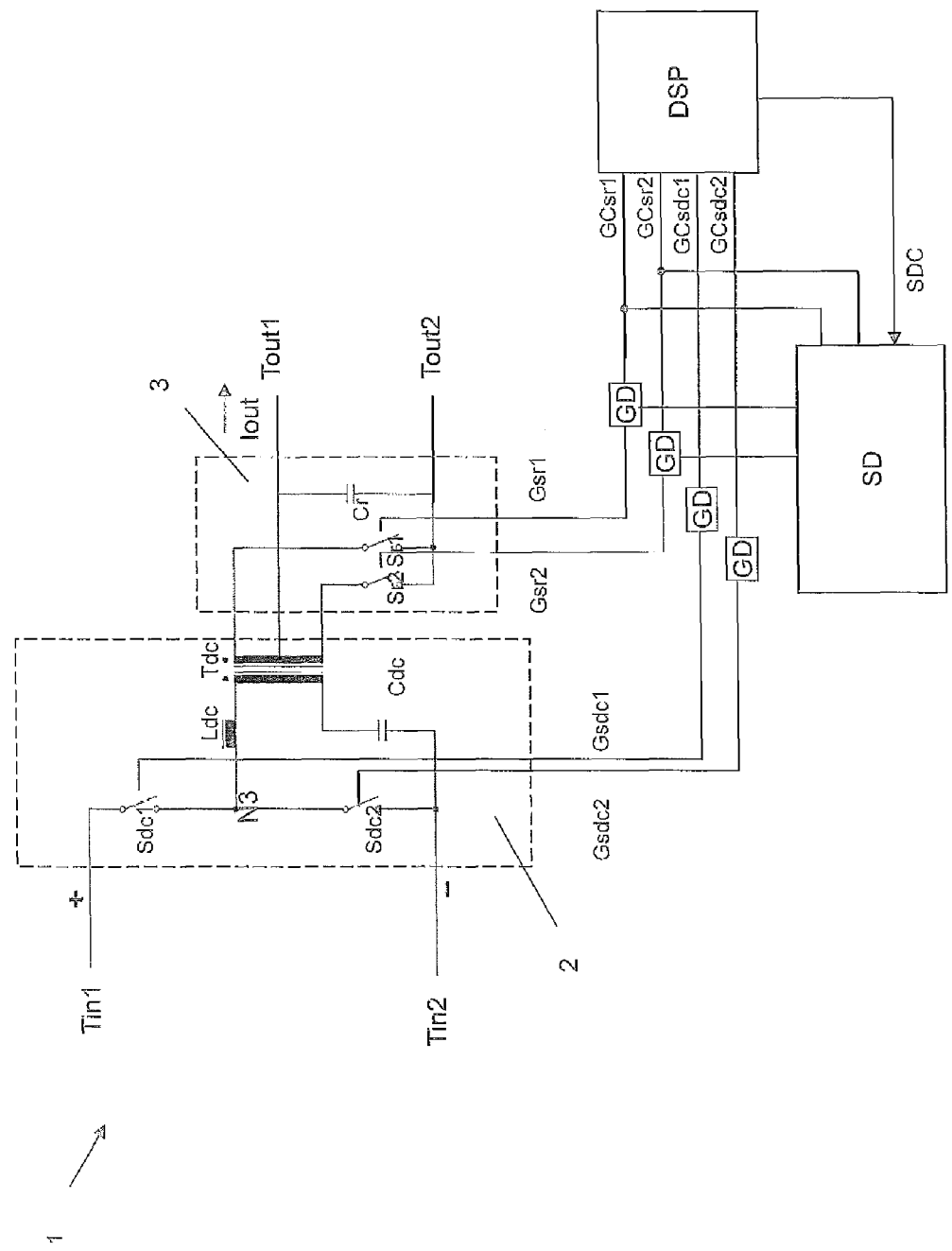
FIG. 2 illustrates a first embodiment of the DC-DC converter according to one or more embodiments of the invention.

The first and second resonant circuit switches Sdc1, Sdc2 each have a gate Gsdc1, Gsdc2. The first and second rectifier switches Sr1, Sr2 each having a gate Gsr1, Gsr2. A digital signal processor DSP is comprising rectifier switch gate control terminals GCsr1, GCsr2 for controlling the first and second rectifier switches Sr1, Sr2 respectively. Moreover, the digital signal processor DSP is comprising resonant circuit switch gate control terminals GCsdc1, GCsdc2 for controlling the first and second resonant circuit switches Sdc1, Sdc2 respectively. A gate driver GD is connected between each gate control terminal GCsr1, GCsr2, GCsdc1, GCsdc2 and the respective gate Gsr1, Gsr2, Gsdc1, Gsdc2. In FIGS. 1 and 2 it is shown that there is highe gate driver connected between each gate of the switches and each gate control terminal of the digital signal processor.

Figure 3:
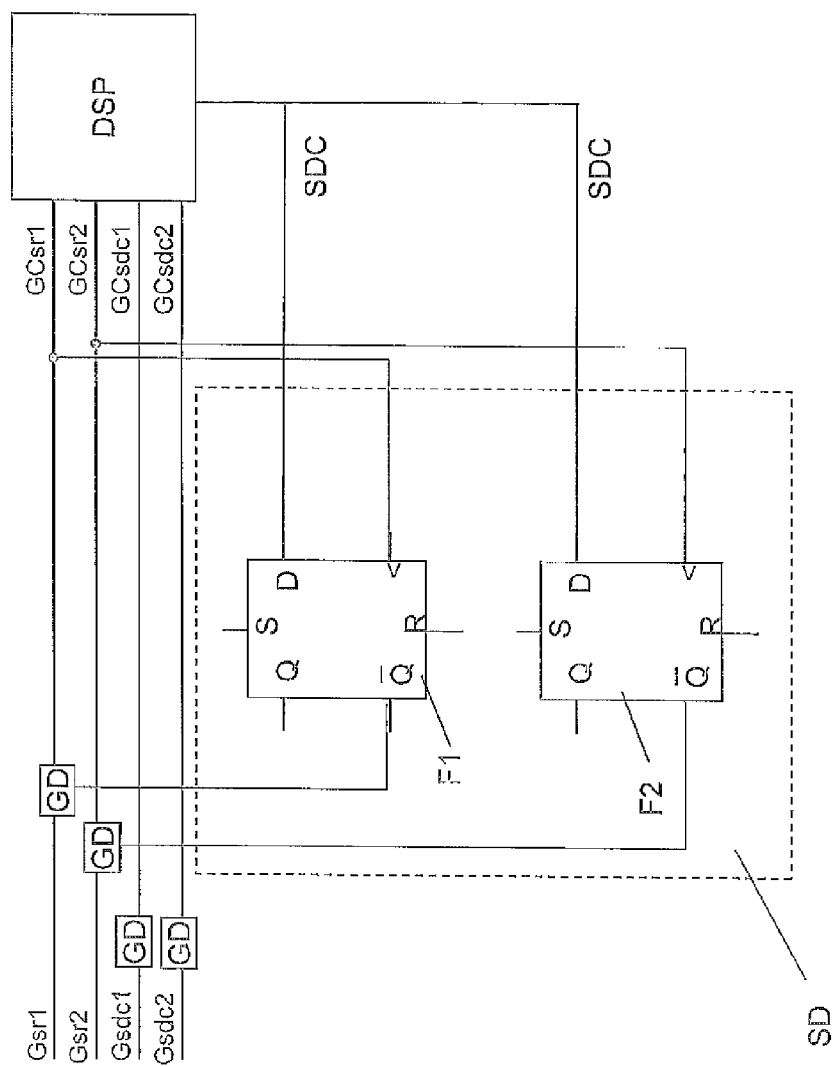
FIG. 3 illustrates the shutdown device of FIG. 2.
Figure 4:
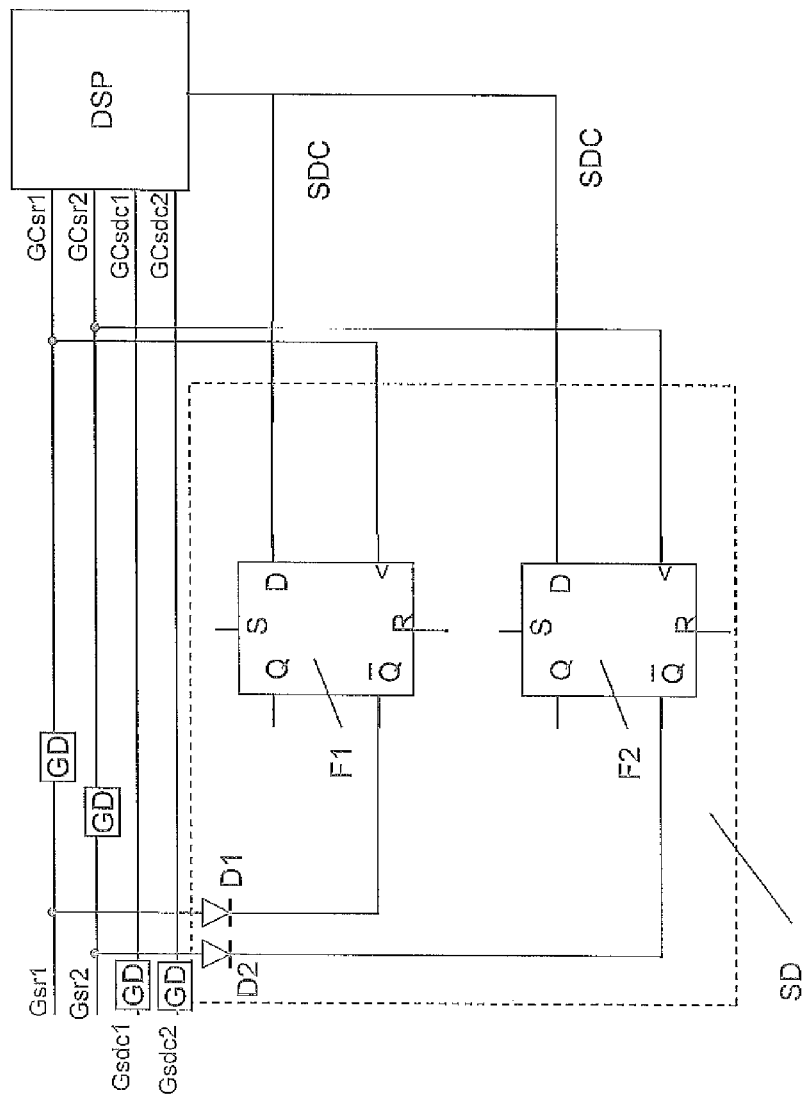
FIG. 4 illustrates the shutdown device of an alternative embodiment of the DC-DC converter.

It is now referred to FIGS. 2-4. Here it is shown that the DC-DC converter device 1 comprises a shutdown device SD. The shutdown device SD is connected between each rectifier switch gate control terminal GCsr1, GCsr2 of the digital signal processor DSP and either an enable terminal of the corresponding gate driver GD or the gate Gsr1, Gsr2 of the corresponding rectifier switch Sr1, Sr2. Hence, the shutdown device SD is separated from the digital signal processor DSP, the function of the shutdown device SD is not a part of the program executed by the digital signal processor.

Moreover, a shutdown signal conductor SDC is connected between the digital signal processor DSP and the shutdown device SD for transferring a shutdown signal from the digital signal processor DSP to the shutdown device SD. The digital signal processor DSP is connected to current/voltage measuring sensors and is detecting whether a shutdown criteria is fulfilled or not. As mentioned above, one such shutdown criteria may be that the output current Iout is negative.

If the shutdown criteria is fulfilled, the digital signal processor DSP is configured to send the shutdown signal to the shutdown device via the shutdown signal conductor SDC. When receiving the shutdown signal, the shutdown device SD is configured to:

control the gates Gsr1, Gsr2 of the first and second rectifier switches Sr1, Sr2 to stay low if the corresponding rectifier switch gate control terminal GCsr1, GCsr2 was turned low when receiving the shutdown signal;

control the gates Gsr1, Gsr2 of the first and second rectifier switches Sr1, Sr2 to stay high if the corresponding rectifier switch gate control terminal GCsr1, GCsr2 was turned high when receiving the shutdown signal, and, when the first and/or second rectifier switch gate control terminal GCsr1, GCsr2 is turned low by the digital signal processor DSP, control the gate Gsr1, Gsr2 of the corresponding rectifier switch Sr1, Sr2 to stay low.

Hence, there are two situations that the shutdown device is handling—a first situation where the rectifier switch gate control terminal GCsr1 or GCsr2 is turned low when receiving the shutdown signal and a second situation where the rectifier switch gate control terminal GCsr1 or GCsr2 is turned high when receiving the shutdown signal.

Figure 5:
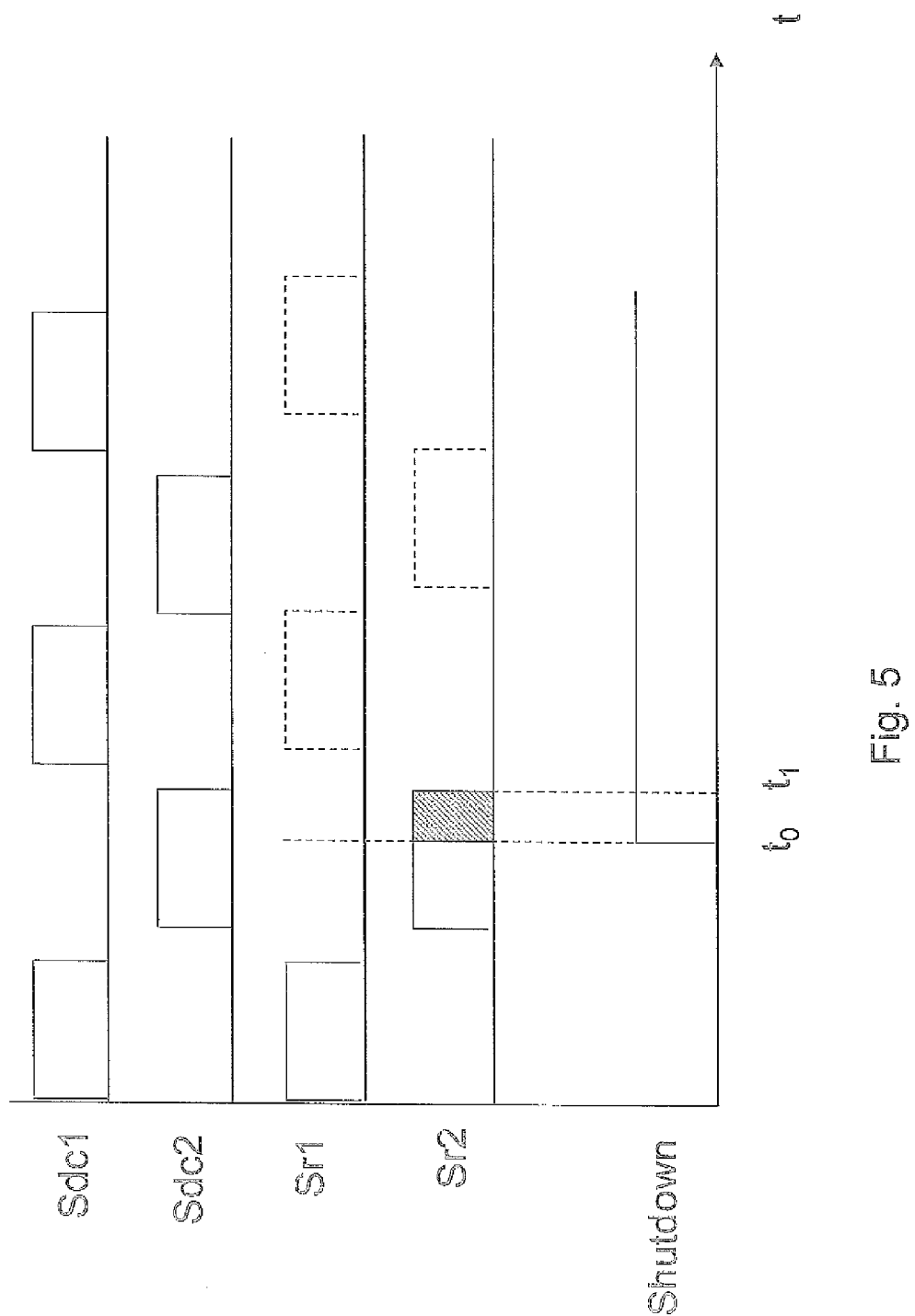
FIG. 5 illustrates the operation of the shutdown device.

These two situations are illustrated in FIG. 5. The switches Sr1 and Sr2 are controlled periodically to be high (on) and low (off) in FIG. 5. At $t=t_0$ the shutdown device SD is receiving a shutdown signal from the digital signal processor DSP.

At $t=t_0$ the first rectifier switch gate control terminal GCsr1 and hence the first rectifier switch Sr1 is low. This represents the first situation above. Here, the shutdown device SD is controlling the gate Gsr1 either directly or via the enable terminal of the gate driver GD to continue to stay low. Hence, for $t>t_0$ the first rectifier switch Sr1 is low even if the rectifier switch gate control terminal GCsr1 is turned high by the digital signal processor DSP (indicated by the dashed signal for Sr1 in FIG. 5).

At $t=t_0$ the second rectifier switch gate control terminal GCsr2 and hence the second rectifier switch Sr2 is turned high. This represents the second situation above. Here, the shutdown device SD is controlling the gate Gsr2 either directly or via the enable terminal of the gate driver GD to continue to stay high for as long as the rectifier switch gate control terminal GCsr2 is turned high. When the second rectifier switch gate control terminal GCsr2 is turned low by the digital signal processor DSP, the shutdown device SD is controlling the gate Gsr2 to stay low, even if the rectifier switch gate control terminal GCsr2 is turned high by the digital signal processor DSP (indicated by the dashed signal for Sr2 in FIG. 5).

Hence, the second rectifier switch Sr2 is allowed to complete its switching cycle and it stays high until $t=t_1$ when it normally would be turned low by the digital signal processor DSP. Consequently, it is achieved that the rectifier switches are not turned low by force.

It is now referred to FIGS. 2 and 3, illustrating the first embodiment. Here, the shutdown device SD is connected between each rectifier switch gate control terminal GCsr1, GCsr2 of the digital signal processor DSP and the enable terminal of the corresponding gate driver GD.

The gate driver GD is considered to be known for a skilled person and is commercially available as for example MOSFET driver chips. It receives a control signal from the digital signal processor with respect to whether a switch should be turned high or low, and forwards this signal as an appropriate control current to the gate of the switch. Some types of gate drivers have an enable terminal, where:

if the enable terminal is high: the gate driver is forwarding the control signal to the gate of the switch;

if the enable terminal is low: the gate driver is turning the control signal to the gate of the switch low.

In the present embodiment, the shutdown device SD comprises a state storing device for each rectifier switch Sr1, Sr2. The state storing device may be a flip-flop device F1, F2, such as a J-K flip-flop, a D flip-flop etc.

In FIG. 3, it is shown that the state storing device is a D flip-flop, where the shutdown signal conductor SDC of the digital signal processor DSP is connected to the control input terminal denoted "D" and where the respective rectifier switch gate control terminals GCsr1, GCsr2 are connected to the respective clock input terminals denoted "<" in FIG. 3. The output terminal $\overline{Q}$ (i.e. the inverted signal of the Q output terminal) is here connected to the enable terminal of the gate driver.

In FIG. 3, the flip-flop is trigging on the negative pulse flank.

It is now referred to FIG. 4, illustrating the second embodiment. Here, the shutdown device SD is connected between each rectifier switch gate control terminal GCsr1, GCsr2 of the digital signal processor DSP and the gate Gsr1, Gsr2 of the corresponding rectifier switch Sr1, Sr2.

Also here the state storing device is a D flip-flop, where the shutdown signal conductor SDC of the digital signal processor DSP is connected to the control input terminal denoted "D" and where the respective rectifier switch gate control terminals GCsr1, GCsr2 are connected to the respective clock input terminals denoted "<" in FIG. 4. The output terminal $\overline{Q}$ (i.e. the inverted signal of the Q output terminal) is here connected to the gate Gsr1, Gsr2 of the corresponding rectifier switch Sr1, Sr2 via diodes D1, D2. The anode of diode D1 is connected to the gate Gsr1 of the first resonant switch Sr1 and the cathode of diode D1 is connected to the output terminal $\overline{Q}$ of the first D flip-flop F1. The anode of diode D2 is connected to the gate Gsr2 of the second resonant switch Sr2 and the cathode of diode D2 is connected to the output terminal $\overline{Q}$ of the second D flip-flop F2.

One or more embodiments of the present invention also relates to a method controlling a DC-DC converter device 1. The method comprising the following steps performed the digital signal processor DSP:

controlling gate drivers GD connected to the respective gate Gsdc1, Gsdc2 of first and second resonant circuit switches Sdc1, Sdc2 of a resonant circuit 2;

controlling gate drivers GD connected to the respective gate Gsr1, Gsr2 of first and second rectifier switches Sr1, Sr2 of a synchronous rectifier 3;

detecting whether a shutdown criteria is fulfilled or not, and, if the shutdown criteria is fulfilled, the method is further comprising the steps of:

sending a shutdown signal to a shutdown device SD.

The method is then comprising the following steps performed by the shutdown device:

controlling the gates Gsr1, Gsr2 of the first and second rectifier switches Sr1, Sr2 to stay low if they were already turned low by the digital signal processor DSP;

controlling the gates Gsr1, Gsr2 of the first and second rectifier switches Sr1, Sr2 to stay high if they already was turned high by the digital signal processor DSP, and, controlling the gates Gsr1, Gsr2 of the corresponding rectifier switch Sr1, Sr2 to stay low when they are turned low by the digital signal processor DSP.

Figure 6:
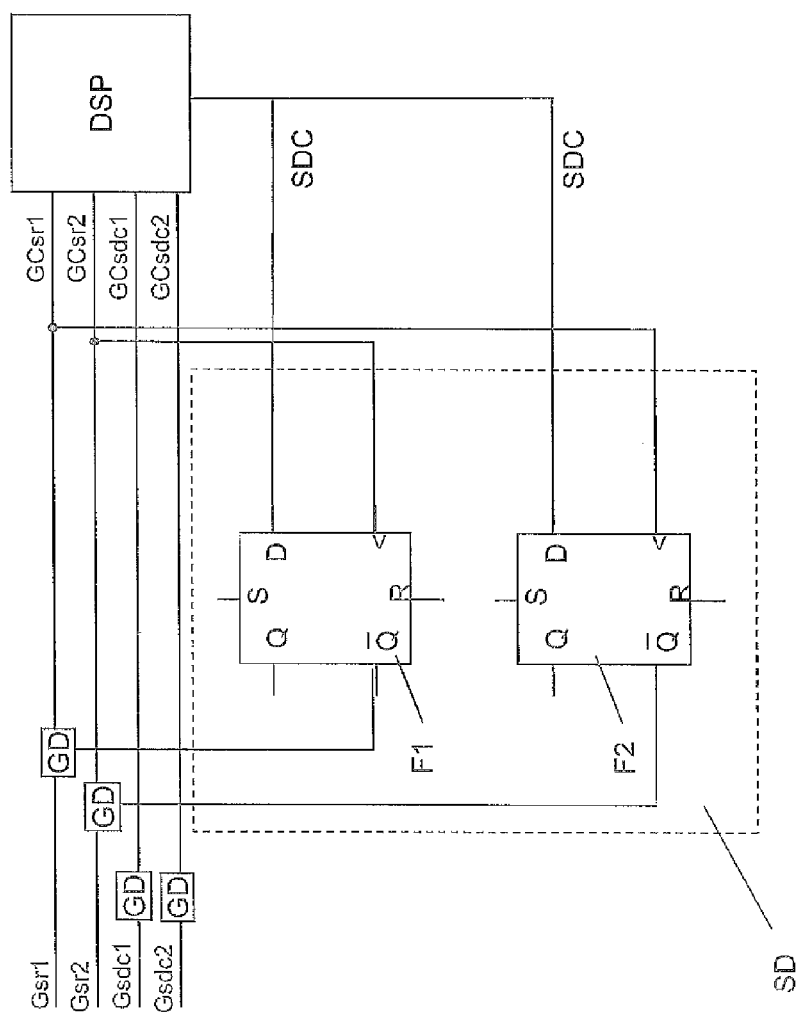
FIG. 6 illustrates yet an alternative embodiment of FIG. 3.

In an alternative embodiment shown in FIG. 6, a the D-flip-flop is trigging on the positive pulse flank. Here, the first rectifier switch gate control terminals GCsr1 is connected to the clock input terminal denoted "<" of the second flip-flop device F2, while the second rectifier switch gate control terminals GCsr2 is connected to the clock input terminal denoted "<" of the first flip-flop device F1.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

The invention claimed is:

1. A DC-DC converter device comprising:
   a resonant circuit comprising DC input terminals and first and second resonant circuit switches each having a gate;
   a synchronous rectifier connected to the resonant circuit, where the synchronous rectifier comprises DC output terminals and first and second rectifier switches each having a gate;
   a digital signal processor comprising rectifier switch gate control terminals for controlling the first and second rectifier switches, respectively, and resonant circuit switch gate control terminals for controlling the first and second resonant circuit switches, respectively;
   a gate driver connected between each rectifier switch gate control terminal and the respective gate of the first and second rectifier switches;
   a shutdown device connected between each rectifier switch gate control terminal and either an enable terminal of the corresponding gate driver or the gate of the corresponding rectifier switch;
   a shutdown signal conductor connected between the digital signal processor and the shutdown device for transferring a shutdown signal from the digital signal processor to the shutdown device;
   wherein the shutdown device is configured to:
   control the gates of the first and second rectifier switches to stay low if the corresponding rectifier switch gate control terminal was turned low when receiving the shutdown signal; and
   control the gates of the first and second rectifier switches to stay high if the corresponding rectifier switch gate control terminal was turned high when receiving the shutdown signal, and, when the first and/or second rectifier switch gate control terminal is turned low by the digital signal processor, control the gate of the corresponding rectifier switch to stay low.

2. The DC-DC converter device according to claim 1, where the shutdown device comprises a state storing device for each rectifier switch.

3. The DC-DC converter device according to claim 2, where each state storing device is a flip-flop device.

4. A method for controlling a DC-DC converter device, the DC-DC-device comprising:
   a resonant circuit comprising DC input terminals and first and second resonant circuit switches each having a gate;
   a synchronous rectifier connected to the resonant circuit, where the synchronous rectifier comprises DC output terminals and first and second rectifier switches each having a gate;
   a digital signal processor comprising rectifier switch gate control terminals for controlling the first and second rectifier switches respectively, and resonant circuit switch gate control terminals for controlling the first and second resonant circuit switches respectively;
   a gate driver connected between each rectifier switch gate control terminal and the respective gate of the first and second rectifier switches;
   a shutdown device connected between each rectifier switch gate control terminal and either an enable terminal of the corresponding gate driver or the gate of the corresponding rectifier switch;
   a shutdown signal conductor connected between the digital signal processor and the shutdown device for transferring a shutdown signal from the digital signal processor to the shutdown device;
   the method comprising the following steps, performed by the digital signal processor:
   controlling the gate drivers connected to the respective gate of the first and second resonant circuit switches of the resonant circuit;
   controlling the gate drivers connected to the respective gate of the first and second rectifier switches of the synchronous rectifier;
   detecting whether a shutdown criteria is fulfilled or not, and, if the shutdown criteria is fulfilled, the method is further comprising the steps of:
   sending a shutdown signal to a shutdown device, where the shutdown device is performing the steps of:
   controlling the gates of the first and second rectifier switches to stay low if they were already turned low by the digital signal processor;
   controlling the gates of the first and second rectifier switches to stay high if they already was turned high by the digital signal processor, and, controlling the gates of the corresponding rectifier switch to stay low when they are turned low by the digital signal processor.

* * * * *